INVENTOR.
Leonard J. Koch
BY
Attorney

Jan. 20, 1959 L. J. KOCH 2,870,076
METHOD AND APPARATUS FOR IMPROVING
PERFORMANCE OF A FAST REACTOR
Filed July 31, 1956 7 Sheets-Sheet 4

INVENTOR.
Leonard J. Koch
BY
Roland A. Anderson
Attorney

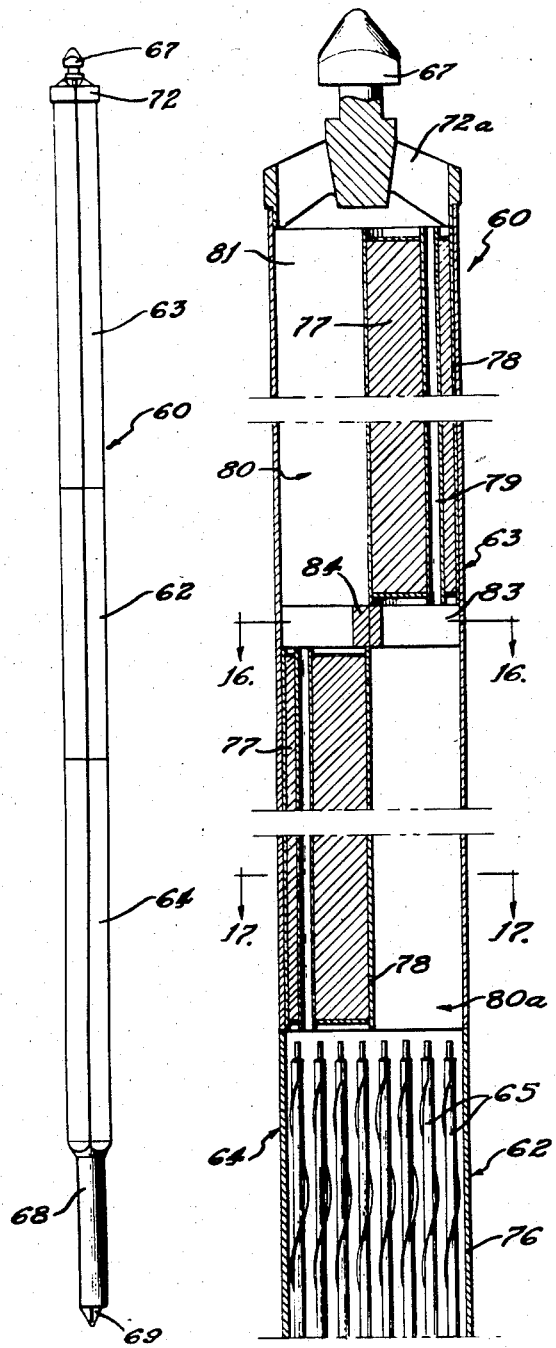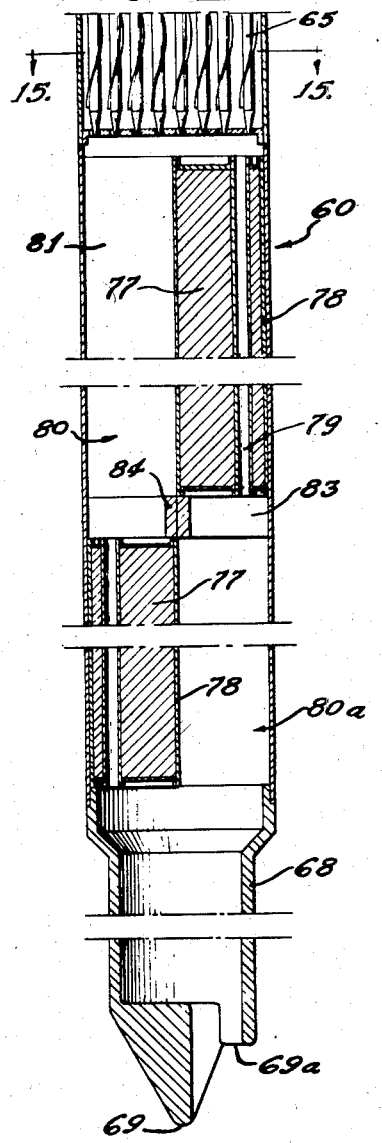

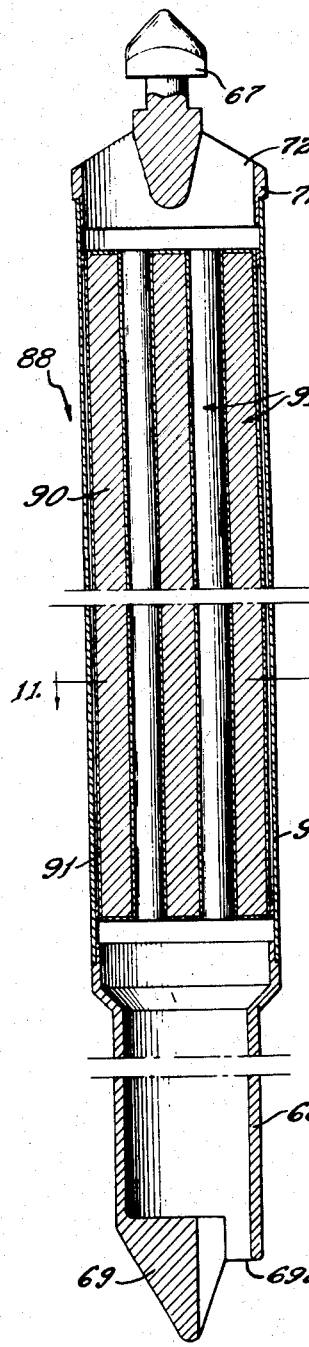
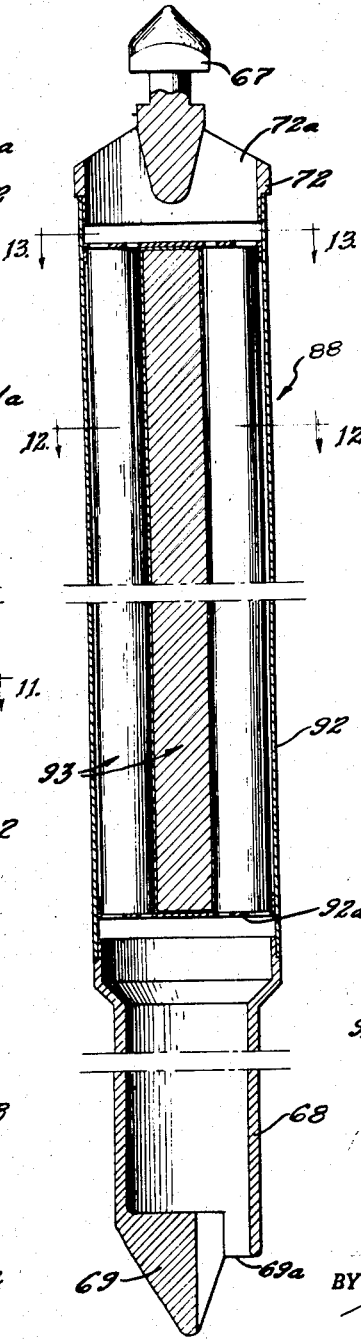
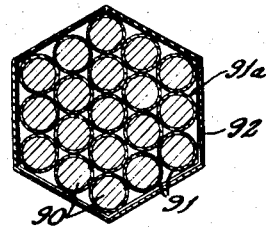
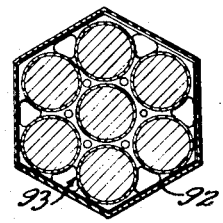
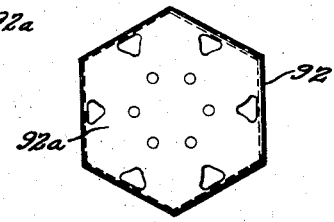

Jan. 20, 1959
L. J. KOCH
2,870,076
METHOD AND APPARATUS FOR IMPROVING
PERFORMANCE OF A FAST REACTOR
Filed July 31, 1956
7 Sheets—Sheet 7
FIG. 14
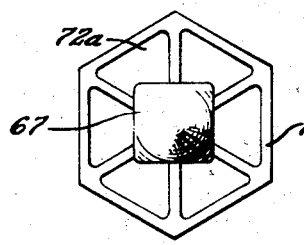
FIG. 15
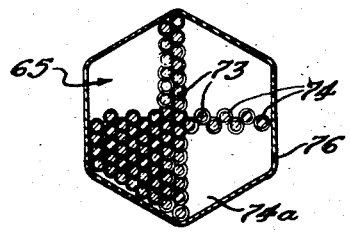
FIG. 16
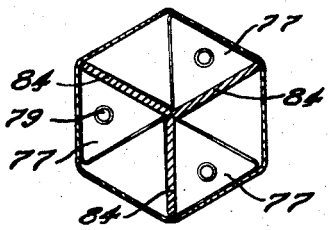
FIG. 17
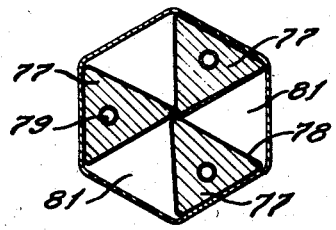
FIG. 18
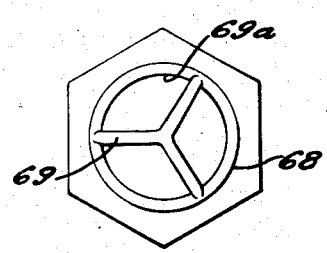
FIG. 20
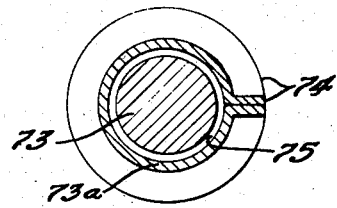
FIG. 19
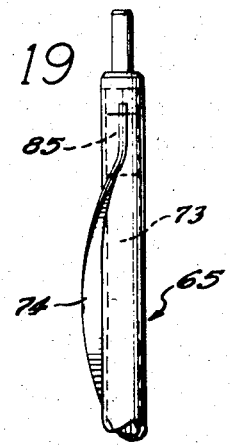
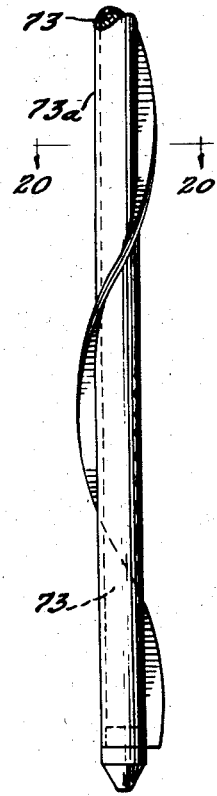
INVENTOR.
Leonard J. Koch
BY
Roland A. Anderson
Attorney

United States Patent Office 2,870,076
Patented Jan. 20, 1959

2,870,076

METHOD AND APPARATUS FOR IMPROVING PERFORMANCE OF A FAST REACTOR

Leonard J. Koch, Clarendon Hills, Ill., assignor to the United States of America as represented by the United States Atomic Energy Commission Application July 31, 1956, Serial No. 601,331

4 Claims. (Cl. 204—193.2)

The present invention relates in general to nuclear reactors and in particular to a method for arranging various materials in the active portion of a fast reactor to achieve improvement in performance and to an apparatus utilizing such an arrangement.

Neutronic reactors are devices for utilizing controlled chain reactions of fissionable material. Their primary utilities are the production of fissionable material, irradiation of materials, and production of power.

Nuclear reactors may be classified in several different ways. One method of classification depends upon the average neutron spectrum maintained within the reactor. Thus nuclear reactors may be classified as fast, intermediate, and slow (thermal) reactors depending upon the average neutron spectrum at which the reactor is operated. If the neutron spectrum within the fuel region of the reactor is predominantly of thermal energy, the reactor is termed a thermal or slow reactor; if the neutron spectra average up to approximately 1000 e. v., the reactor is termed intermediate; and if the neutron spectrum average greater than 1000 e. v., then the reactor is called a fast reactor. Some neutrons are emitted in the fission process at an energy of above 1,000,000 e. v. or more. If these neutrons are utilized at these high energies, the reactor is a fast reactor. The nuclear reactors are also classified as to the material which they are primarily designed to produce. The reactors which are primarily designed to produce fissionable material or other irradiated material are termed production reactors; the reactor which are primarily designed to produce power are termed power reactors; and, if the reactors are designed to produce both irradiated materials and power they are termed dual purpose reactors.

Production reactors may be of several different types, one type being a converter reactor in which the neutrons produced by fission are absorbed in a source material, usually called fertile material, which, by radioactive decay, will produce a second fissionable material. An example of this type of reactor is the reactor in which U-235 is used as fissionable fuel. The neutrons emitted by the fission of U-235 are captured in U-238 to produce U-239, which decays by a beta decay chain through Np-239 to produce Pu-239, a second fissionable material. If the reactor produces a greater number of atoms of fissionable material than it consumes in the process, the reactor is termed a breeder.

Several fast reactors have been built and some of these are described in "Principles of Nuclear Reactor Engineering," by Samuel Glasstone, D. Van Nostrand Co., Inc., 1955, pages 832 et seq. The active portion of a fast reactor comprises fissionable material, fertile material and a reflector. Generally, the fast reactor has a core which is a cylinder of enriched uranium or plutonium surounded by a mass of fertile material usually termed a blanket which surrounds the core for the purpose of beneficially absorbing the neutrons released in the core. The blanket is made of a suitable material which is capable of absorbing neutrons, such as U-238 or thorium. The blanket is in turn surrounded by a mass of material serving to reflect escaping neutrons back into the reactor active portion, said mass, such as graphite, for example, being generally known as a reflector. The construction of another example of a fast reactor is described in "Proceedings of the International Conference on the Peaceful Uses of Atomic Energy," vol. 3, United Nations, 1955, pages 345–360.

It is characteristic of efficient fast reactors that a high thermal rating, or power density, must be obtained in the reactor core. The neutron flux, and thus the heat generation, is the highest at the center, and diminishes toward the edge of the core. This characteristic creates design problems since the heat removal system must be designed to adequately cool the center region which operates at the highest power density (highest heat generation rate per unit volume of core).

It is the main object of the invention to provide a fast neutronic reactor having an active portion including a hollow core made of fissionable material and containing fertile material inside the core and surrounding the core to absorb beneficially the neutrons released during the fission process.

It is another object of the invention to provide a method wherein the materials comprising the active portion of a fast neutronic reactor are arranged so that substantially all the neutrons released during the fission process are utilized beneficially.

Another object of the invention is to provide an arrangement of materials within the active portion of a fast neutronic reactor in such a manner as to flatten the neutron flux distribution through the central portion of the reactor to achieve an improvement in reactor performance.

A further object of the invention is to provide a method for arranging the materials in the active portion of a fast neutronic reactor to beneficially absorb the released neutrons and to effectively lower the operating temperatures within the center of the reactor.

Other objects of the present invetnion will be apparent from the description which follows:

In accordance with the teachings of the present invention, an improvement in the performance of the fast reactor is attained by making the core a hollow cylinder and placing therein a central blanket of depleted uranium and surrounding the core with additional blankets of the same depleted uranium.

The method will first be described and then a detailed description of the apparatus will be given. The method comprises the steps of arranging a group of elements containing fissionable material into a hollow fuel core, placing elements containing a fertile material of low unit volume fraction, such as depleted uranium, into the interior of the fuel core to form a central blanket, surrounding the fuel core with elements containing similar fertile material of low unit volume fraction to form an inner blanket, and surrounding the inner blanket with elements containing a fertile material of a high unit volume fraction to form an outer blanket which in turn is surrounded by a reflector. The unit volume fraction indicates the fraction of the fertile material contained in a unit volume of the element. By making the fuel core a hollow cylinder and placing therein a central blanket of depleted uranium, a dual result is accomplished; the flux pattern is flattened substantially eliminating zones of unusually high heat output; and secondly, the central zone, having a high statistical weight with respect to neutron flux, is a zone of high production and utilization of fissionable material.

The advantages of the apparatus and method of the present invention will be more fully understood from the following description including the drawings wherein:

Figure 6 is an elevational view of a fuel rod of the fast breeder reactor;

Figure 7 is a sectional vertical elevation of an upper portion of the fuel rod of the fast breeder reactor showing fuel elements and upper blanket prisms;

Figure 8 is a sectional vertical elevation of a fast breeder reactor fuel rod showing fuel elements, lower blanket prisms, base and tip;

Figure 9 is a vertical sectional view of a blanket rod used in the central and inner blankets of the fast breeder reactor;

Figure 10 is a vertical sectional view of the blanket rod used in the outer blanket of the fast breeder reactor;

Figure 11 is a transverse sectional view of an inner blanket rod taken along line 11—11 of Figure 9;

Figure 12 is a transverse sectional view of an outer blanket rod, taken along line 12—12 of Figure 10;

Figure 13 is a transverse sectional view taken along line 13—13 of Figure 10 and also shows a blanket-rod plate;

Figure 14 is a plan view of a fuel rod of the fast reactor;

Figure 15 is a transverse sectional view of a fuel rod assembly showing only some of the fuel rods used and taken along line 15—15 of Figure 8;

Figure 16 is a transverse sectional view of the upper blanket portion of the fuel rod taken along line 16—16 of Figure 7;

Figure 17 is a transverse sectional view of the upper blanket portion of the fuel rod taken along line 17—17 of Figure 7;

Figure 18 is a bottom plan view of the fuel rod;

Figure 19 is a vertical elevation of the fuel element; and

Figure 20 is a transverse sectional view of the fuel element taken along line 20—20 of Figure 19.

FAST POWER BREEDER REACTOR

The term "nuclear reactor" in the present description of the fast reactor is used to denote the active portion of a chain reacting device. The term "nuclear reactor system" is used to designate the nuclear reactor, primary coolant system, including reactor tank, primary coolant heat exchanger, primary coolant pump and primary coolant.

Figure 1:
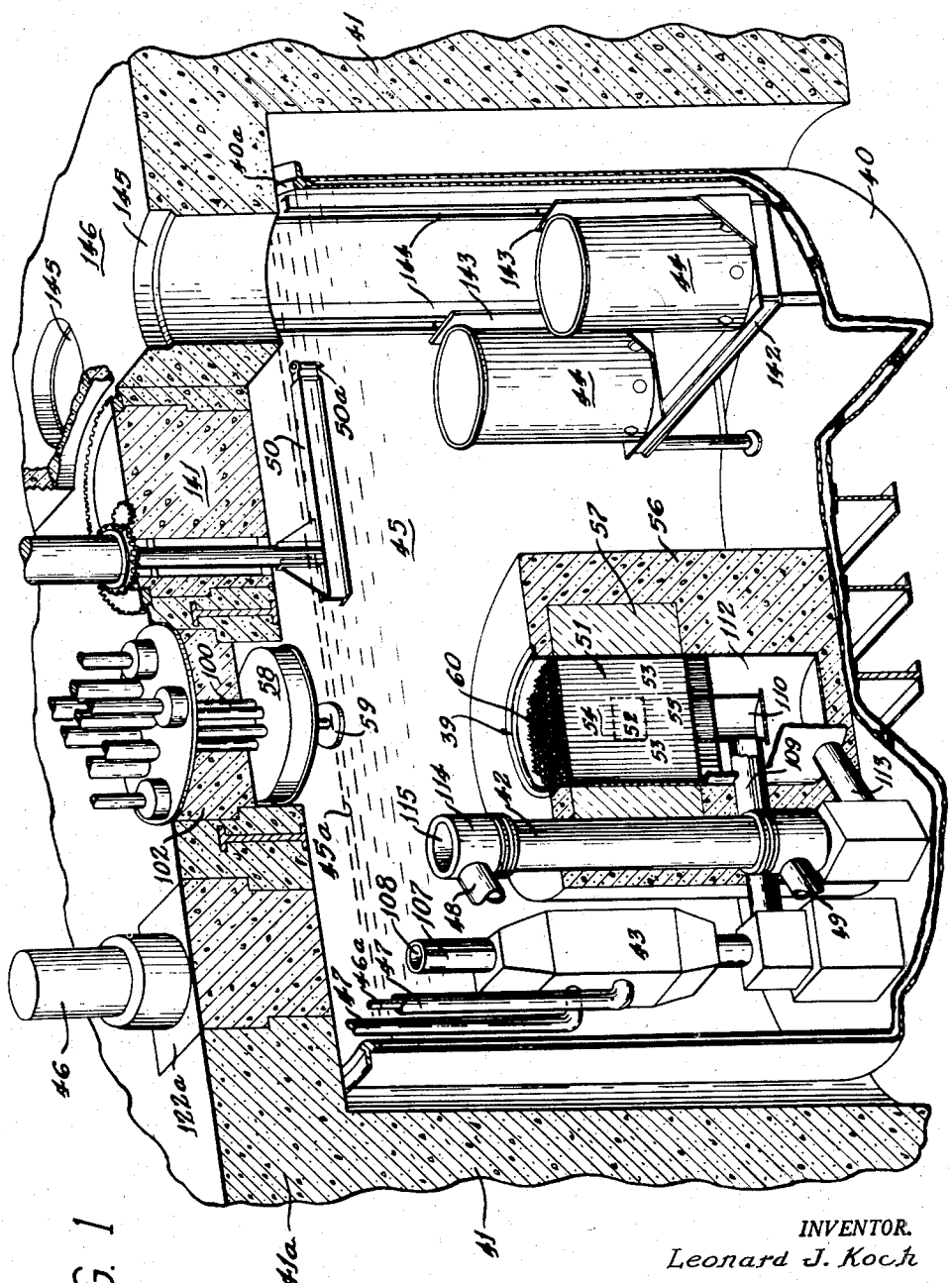
Figure 1 is an isometric sectional view of a series-flow breeder reactor, a heat exchanger, a coolant pump, and a tank in which they are submerged.

Although two modifications of a fast breeder reactor utilizing the novel arrangement of materials within the active portion are illustrated in the enclosed figures, it is understood that other reactors of various sizes may be constructed according to the principles enumerated herein. The disclosed modifications are of the 800 liter size. The size figure refers to the volume of the fuel core of the reactor. Another reactor, of a smaller capacity but similar in essential features, is disclosed in considerable length in a copending application Serial No. 437,017, "Power Reactor," by Walter H. Zinn, filed on June 15, 1954, now Patent No. 2,841,545, issued July 1, 1958. Therefore, the details of the reactor presented herein will not be described in this application. The 800 liter reactor has a fuel region power density of 1.0 megawatt per liter and a total capacity of 940 megawatts of heat energy. The 800 liter size is suitable for large central station power plant requirements. Two modifications of coolant flow are illustrated; in Figures 1 and 2 the primary coolant flows in series upward through the reactor core and then downward through the reactor blanket, and in Figures 3 and 4, the primary coolant has a parallel flow upward both through the reactor core and the reactor blanket.

The reactor 39 is contained in a tank 40. The tank is an imperforate unitary tank, i. e., it has no openings or outlets below the rim 40a of the tank. The dimensions of the tank for the 800 liter reactor are 40 feet by 28 feet by 22 feet, said tank containing 1,110,000 lbs. of a primary coolant, such as sodium. The reactor tank 40 is contained in a thick-walled concrete reactor cell 41 which also has no openings below the roof 41a of the cell. The tank 40 contains not only the reactor itself but also a primary heat exchanger 42, a primary coolant pump 43 and fuel rod storage tanks 44. The reactor tank 40 is substantially filled with the primary coolant, preferably sodium 45, which completely immerses the reactor, primary heat exchanger 42 and primary coolant pump 43. The electrical power for operating the primary coolant pump 43 is supplied to the pump from an electric generator 46 through bus bars 46a contained in conduits 47. The secondary coolant enters the primary heat exchanger by the secondary coolant inlet line 48 and leaves by the secondary coolant exit line 49. A jib crane 50 is provided for the remote control handling of fuel rods between the reactor and the fuel rod storage tanks 44. The reactor has an active portion 51 including a core section 52a, a radial blanket section 53, an upper blanket section 54, and a lower blanket section 55. The active portion 51 of the reactor is disposed within a shield 56 which also contains a reflector portion 57. A lid 58 is provided for the active portion 51. In the reactor modification having only an upward flow of coolant through the core, an upper core grid 59 is also provided to prevent the fuel rods 60 from being displaced upwardly by the flow of the coolant.

THE REACTOR ACTIVE PORTION

The active portion 51 of the reactor 39 is best illustrated by Figures 1 and 2 and 14 to 20 and contains a plurality of fuel rods 60 and blanket rods 61 disposed within the active portion 51. The fuel rods 60 need not be of any particular construction as long as they are of suitable physical structure which permits adequate cooling and contains the proper materials in proper proportions, as will be set forth later. The fuel rod 60 disclosed in Figures 6, 7, 8 and 14 through 20 are used in the present reactor. Other suitable fuel rods are shown and claimed in the copending application of the common assignee, Serial No. 236,644, "Fuel Element," filed July 13, 1951.

The fuel rod 60 comprises essentially 3 regions, a fuel section 62, an upper blanket section 63 and a lower blanket section 64. In the fuel rod 60 illustrated in the present application, the fuel section 62 comprises a plurality of fuel elements 65, each element containing a quantity of fissionable isotope, such as U-235, Pu-239 or U-233, in a suitable form, such as a metal or a salt, and disposed in a suitable diluent, such as U-238, thorium, and zirconium. The upper blanket section 63 and the lower blanket section 64 of the fuel rods 60 comprise triangularly-shaped prisms 77 made of neutron absorbing material. This material may be either a material capable of being converted into a nuclear fuel by neutron absorption, such as U-238 of Th-232, or it may be some other material which will produce a useful material through neutron irradiation, such as Co-59 which produces the radiation source material Co-60. Referring to Figure 6, the fuel rod 60 is provided with a hanger 67 at one end and a base 68 with a tip 69 at the other end.

The tip 69 contains an orifice 69a. The base is designed to fit into an aperture 70a (Figure 2) in the base plate 70 and the tip 69 into an aperture 71a in the tip plate 71, so that the fuel rod 60 is held upright in the active portion of the reactor. The hanger 67 is attached to the hanger plate 72 which has an orifice 72a within itself to permit the flow of the primary coolant through the fuel rod 60. The hanger 67 is adapted to be gripped by the hook 50a of the jib crane 50. The areas of the orifices 69a and 72a may be varied to adjust the flow of coolant through the rod 60.

The fuel section 62 comprises a plurality of fuel elements 65. As illustrated in Figures 19 and 20, the fuel element 65 consists of one or more fuel cylinders 73 contained in a thin-walled tube 73a. In the modifications illustrated, the fuel cylinder 73 is an alloy of uranium and plutonium with the plutonium present at about 5 to 15% of the total mass, and preferably about 10%, and the uranium balance being natural uranium, that is, having an isotopic content of 99.3% of U-238 and 0.7% of U-235, or preferably a uranium which has been depleted in U-235, that is, uranium having a U-235 content of less than 0.7%. The uranium which has been depleted in U-235 is a relatively inexpensive by-product of a U-235 enrichment process or a plant recovering plutonium from neutron-irradiated uranium. While the plutonium content of the uranium-plutonium alloy should predominate in the thermally fissionable isotope Pu-239, the plutonium may be contaminated with very substantial amounts of higher plutonium isotopes such as Pu-240 and Pu-241, since both of these isotopes are fissionable with neutrons in the fast energy spectrum. The plutonium may be replaced in the fuel alloy with other fissionable materials, such as U-233 and U-235. Since the present reactor is designed to operate in the fast neutron range, other actinide isotopes having fission cross sections in this region, such as Np-237, may also be used as the fissionable component. The average range of the neutrons upon which the present reactor operates lies between about 0.2 m. e. v. and 0.8 m. e. v.

The fuel tube 73a is preferably constructed of stainless steel. The fuel tube 73a of the present embodiment is a 0.188 inch outside diameter stainless steel tube having a rib 74 of the same material as the tube, which rib spirals around the outside of the tube on a 4 inch pitch. These ribs serve to hold the tubes 0.066 inch apart when the tubes are massed together. In the present embodiment, there are approximately 169 tubes massed into a hexagonal pattern or assembly 74a. A primary coolant flows between and around the elements in the assembly. There is an internal bond 75 in the tube 73a between the fuel cylinders 73 and the inner wall of the tube 73a, said bond consisting of sodium. The assembly of the tubes is held together in a hexagonal stainless steel sheath 76 and is shown in Figure 15.

The upper blanket section 63 of the fuel rod 60 comprises a plurality of triangular prisms 77 of a fertile material, preferably a uranium depleted in U-235 below the concentration occurring in natural uranium. The upper blanket prisms 77 are covered with a cladding 78 of a material such as is used for the fuel tubes 73a, for example, stainless steel. The prisms 77 contain a channel 79 which provides an internal path for the flow of the primary coolant. The six prisms 77 normally employed in the upper blanket section 63 are arranged in two banks of three prisms each. The upper bank 80 (Figure 7) has three prisms equidistantly spaced from each other and separated from each other by triangular-shaped coolant channels 81. The lower prism bank 80a of the upper blanket section 63 has its prisms 77 arranged in a similar manner. There is an offset coolant channel 83 between the upper and the lower banks 80 and 80a, respectively, of the upper blanket section 63, as shown in Figures 7, 16 and 17. Since the prisms 77 of the upper and the lower banks 80 and 80a, respectively, are offset, no straight line path is presented to neutrons generated in the fuel region 62 of the fuel rod 60, and thus tendency of "neutron streaming" is suppressed. The offset channel section 83 of the upper blanket region 63 has three dividers 84 equidistantly spaced in the offset section 83, as shown in Figures 7 and 16, in such a manner as to limit the tendency for the primary coolant to assume turbulent flow through this offset.

The components of the lower blanket region 64 of the fuel rod 60, namely the prisms 77, the prism cladding 78, the prism coolant channels 79 and the offset channel dividers 84 are substantially identical with those of the upper blanket region 63 of the fuel rod 60. The configurations of the upper bank 80 and the lower bank 80a and the offset channels 83 in the lower blanket section 64 are also similar to those of the upper blanket section 63. The upper blanket section 63, the fuel region 62 and the lower blanket section 64 of the fuel rod 60 are joined together as shown in Figure 6.

The dimensions of a typical fuel rod 60, as employed in the present reactor modification, are 109 inches overall length and 3.65 inches across the flats of the hexagon assembly; the fuel element 65 is 38⅜ inches long while the fuel cylinder 73 is 36 inches long with a 2½ inch space 85 above it in the tube 73a into which the fuel cylinder 73 may expand. The blanket prisms 77 of the upper and the lower blanket sections 63 and 64, respectively, are each 12 inches long and the offset channels 83 are 1 inch long. The fuel rods 60 are arranged in a hollow core, as will be described later, to form a hexagonally-shaped cluster of fuel rods 60. Since each of the fuel rods 60 contains a fuel section 62 in the middle of the fuel rod 60, the hexagonal cluster of fuel rods 60 will define a hexagonal hollow core containing the fissionable material in the middle of the reactor. The fuel region dimensions, fuel region composition in volume percent, and the number of fuel rods involved are shown in Table I. It will be noted that the fuel region contains between about 3 to 10% volume of thermally fissionable material, and between about 20 to 30% by volume of a diluent. The diluent to be chosen should be the one that forms a desirable product upon a neutron irradiation, or has a relatively high fast fission cross section, or forms a metallurgically satisfactory alloy with the thermally fissionable component of the alloy. Lithium is an example of the first category, Np-237 of the second, and zirconium of the third. The preferred diluent, uranium, is advantageous from all three viewpoints. The active portion 51 contains between about 300 to 450 kg. of plutonium contained in a fuel alloy occupying between 30 and 35% by volume of the active portion.

Table I

Fuel region dimensions:
Length, inches _____ 36
Inner diameter, inches _____ 11.0
Outer diameter, inches _____ 26.0
Length outer diameter ratio _____ 1.38
Fuel region composition (vol. percent):
Fuel alloy (U+Pu) _____ 33.5
Thermally fissionable material (Pu) _____ 3.4
Structural material (stainless steel) _____ 14.8
Flowing coolant (Na) _____ 45
Stagnant coolant (internal bond) (Na) __ 6.7
Fuel:
Fuel cylinder 73 diameter, inches _____ 0.164
Tube 73a thickness _____ 0.008
Fuel element 65 O. D., inches _____ 0.188
No. of elements 65 per assembly 74a _____ 169
No. of assemblies 74a per reactor _____ 127
Fuel composition:
Fuel alloy, kg. _____ 4940
Plutonium (critical mass), kg. _____ 450
Enrichment, percent (Pu/fuel alloy) ____ 9.1
Blanket
Uranium in blanket, kg_____ 109,000

In the foregoing table, the term "flowing coolant" refers to the quantity of primary coolant flowing through the core section 52 at any instant of full power operation. The term "stagnant coolant" refers to the coolant contained in the fuel rods 60 as a liquid bond between the cylinders 73 and the fuel tubes 73a. The fuel described above is plutonium, contained in a matrix of depleted uranium.

While the fuel has plutonium contained in a matrix of depleted uranium, other fuel materials may be used. For example, U-235 may be substituted for the plutonium in the fuel material of the above reactor. However, a larger mass of U-235 will be required for the critical mass, 750 kg. of U-235 being required as against 450 kg. of Pu-239. Other materials fissionable by neutrons of all energies, such as U-233, Pu-241 and Am-242 may also be substituted for the plutonium. Also, mixtures of fissionable materials, such as U-235 and Pu-239, may be used as the fissionable component of the fuel material in the present reactor. The critical masses of other fissionable materials may be determined for particular reactor active portion configurations according to the methods disclosed in such publications as "Current Status of Nuclear Reactor Theory," A. Weinberg, American Journal of Physics, vol. 20, October 1952, pp. 401-412, "Multigroup Methods for Neutron Diffusion Problems," R. Ehrlich and H. Hurwitz, Jr., Nucleonics, vol. 12, No. 2, February 1954, pp. 23-30. The pertinent cross sectional data may be obtained from such publications as "Neutronic Cross Sections," AECU-2040, OTS, Department of Commerce.

The radial blanket 53 of the reactor 39 is made up of blanket rods 88 identical in external appearance with the fuel rods 60, including identical hangers 67, hanger plates 72, bases 68 and tips 69. The blanket rods 88 contain cylinders of absorbing material which, in the reactor illustrated, is uranium that has been depleted in the uranium isotope U-235 below the content of U-235 normally found in natural uranium. This depleted uranium is a product obtained from the operation of any natural uranium thermal reactor such as described in the U. S. Patent 2,708,656, issued on May 17, 1955, to E. Fermi et al. It also may be obtained as a by-product of the operation of a uranium isotope separation plant. Other materials also may be employed in this rod, for example, natural thorium may be employed if it is desired to produce U-233; lithium or lithium alloys may be employed if it is desired to produce tritium; or such elements as the natural cobalt isotope Co-59 may be employed if it is desired to produce the isotope Co-60.

The absorbing material in the blanket rod 88 is in the form of cylinders 90 which are covered with cladding 91 of a suitable material, such as zirconium, stainless steel, nickel alloy, titanium alloy or aluminum alloy, to form a blanket element 91a. These elements are packed into the rod sheath 92. The blanket elements 91a are held together in the sheath 92 by spot welding the blanket elements together, or by other conventional methods. The interstices between these elements and between the elements and sheath wall permit a flow of primary coolant up through the blanket rods 88. Various modifications of the blanket arrangement may be desirable. For example, it may be desirable to have two radial blanket regions with smaller rods and greater cooling capacity in an inner blanket and larger rods and smaller cooling capacity in an outer blanket region, as is fully discussed in the above-referred to copending application Serial No. 437,017, "Power Reactor," filed by Walter H. Zinn on June 15, 1954, now Patent No. 2,841,545, issued July 1, 1958.

Blanket dimensions and compositions are shown in Table II.

Table II

| | |
|---|---|
| Blanket dimensions: | |
| Height, in | 90 |
| Outer diameter, in | 90 |
| Radial blanket thickness, in | 24 |
| Upper axial blanket height, in | 24 |
| Lower axial blanket height, in | 24 |
| Total volume, cu. ft | 297.7 |
| Total volume, liters | 8430 |
| Radial blanket 53 composition (vol. percent): | |
| Fertile material (meat) (U) | 70 |
| Structural material (stainless steel) | 10 |
| Coolant (Na) | 20 |
| Axial blanket composition (vol. percent): | |
| Fertile material (meat) | 40 |
| Structural material | 10 |
| Coolant | 45 |
| Stagnant coolant | 5 |
| Radial blanket elements 91a: | |
| Blanket cylinder 90 material diameter, in | 0.630 |
| Clad 91 thickness, in | 0.010 |
| Element 91a O. D., in | 0.650 |

The blanket is surrounded by a reflector 57 consisting of a hollow cylinder of neutron-reflecting material. In the reactor illustrated, this reflector is constructed of 51,300 pounds of graphite and the dimensions of the hollow cylinder are 98 inches internal diameter, 146 inches external diameter and 8 feet high. While the reflector is not essential to maintain the chain reaction in the active portion, it is desirable to increase the neutron economy in the blanket regions.

The reactor 39 is surrounded by a shield 56 which serves both as a biological shield to protect operating personnel and external equipment from radiation, and also as thermal insulation. The shield 56 may be constructed by conventional methods, and is preferably composed of high-density concrete containing iron punchings, barytes, colemanite, limonite, or other similar heavy metal ore. In the present reactor, the concrete shield contains 392,000 pounds of such high-density concrete.

REACTOR CONTROL SYSTEM

Figure 2:
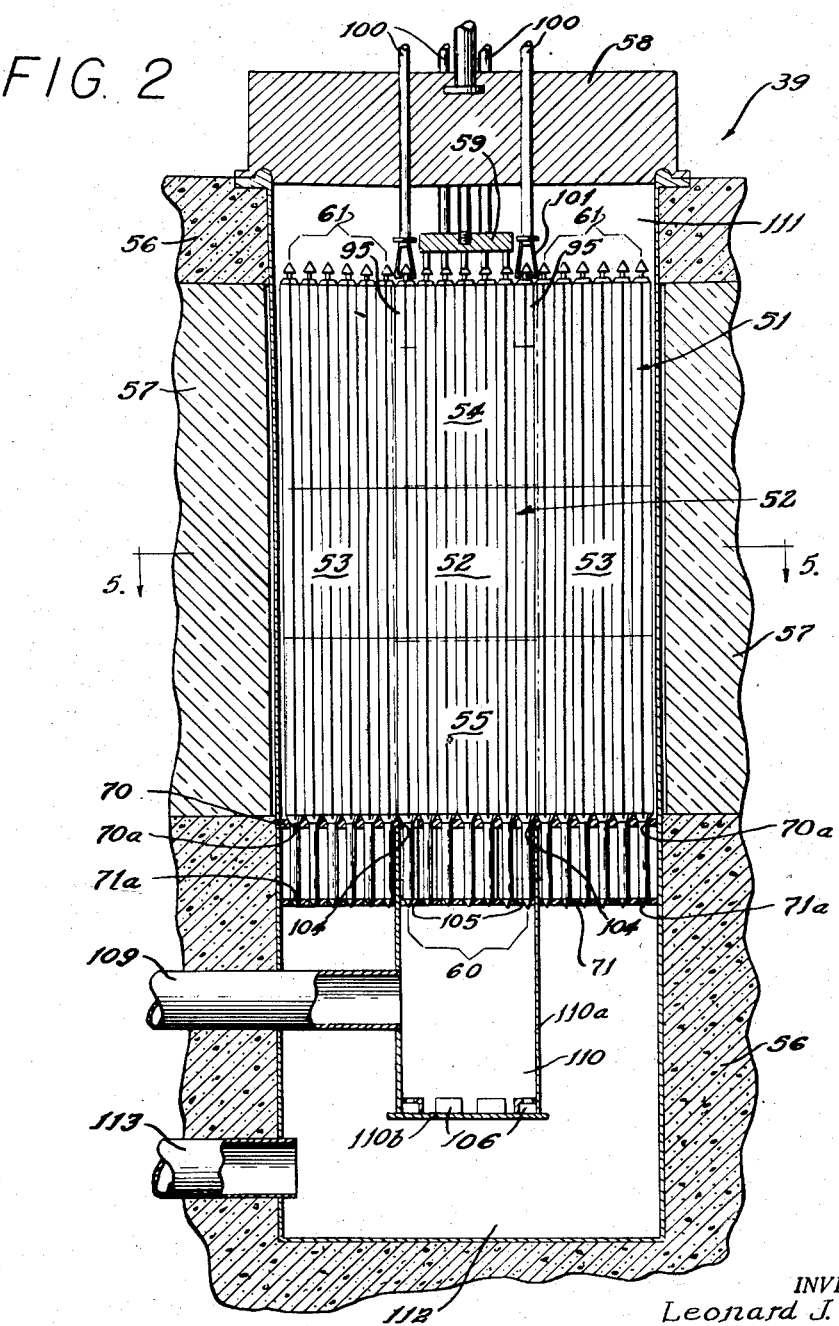
Figure 2 is an enlarged vertical sectional view of a core of the series-flow reactor of Figure 1.

Control of the reactor is accomplished by varying the amount of fuel material of the reactor in the core region of the reactor. This is accomplished by disposing control rods 95 about the active portion, as shown in Figure 2. The operation of the control mechanism of the reactor is conventional and is fully described in the copending application referred to, Serial No. 437,017, now Patent No. 2,841,545.

POWER PRODUCTION

The present reactor is cooled by a flow of a liquid metal, preferably sodium, through the active portion of the reactor. The reactor 39, the primary heat exchanger 42, the primary coolant pump 43 and all the primary coolant 45 are contained within the unitary imperforate tank 40. In the series-flow reactor 39 illustrated in Figure 1, the liquid sodium contained in the reactor tank 40 enters the primary coolant system through a pump inlet pipe 107 by an inlet 108, is pumped through an electromagnetic liquid metal pump 43 and passes through a reactor inlet pipe 109 into the reactor inlet manifold 110 defined by the vertical wall 110a and horizontal wall 110b. The coolant then flows into the tips 69 of the fuel rods 60 through the orifice 69a and upwardly through these fuel rods to exit through a second orifice 72a into a reactor plenum chamber 111. The coolant then flows downwardly through the blanket rods into the reactor exit manifold 112. From this manifold 112, the primary coolant then flows through reactor exit pipe 113 to the heat exchanger 42. The primary coolant flows upwardly through the heat exchanger and leaves the primary coolant flow system through the heat exchanger exit pipe 114, containing the outlet 115, to the mass 45 of primary coolant contained in the reactor tank 40.

Figure 3:
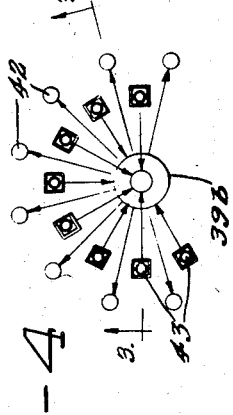
Figure 3 is a vertical sectional view of an upward parallel-flow fast breeder reactor and associated primary heat exchangers and primary pumps taken along line 3—3 of Figure 4.
Figure 4:
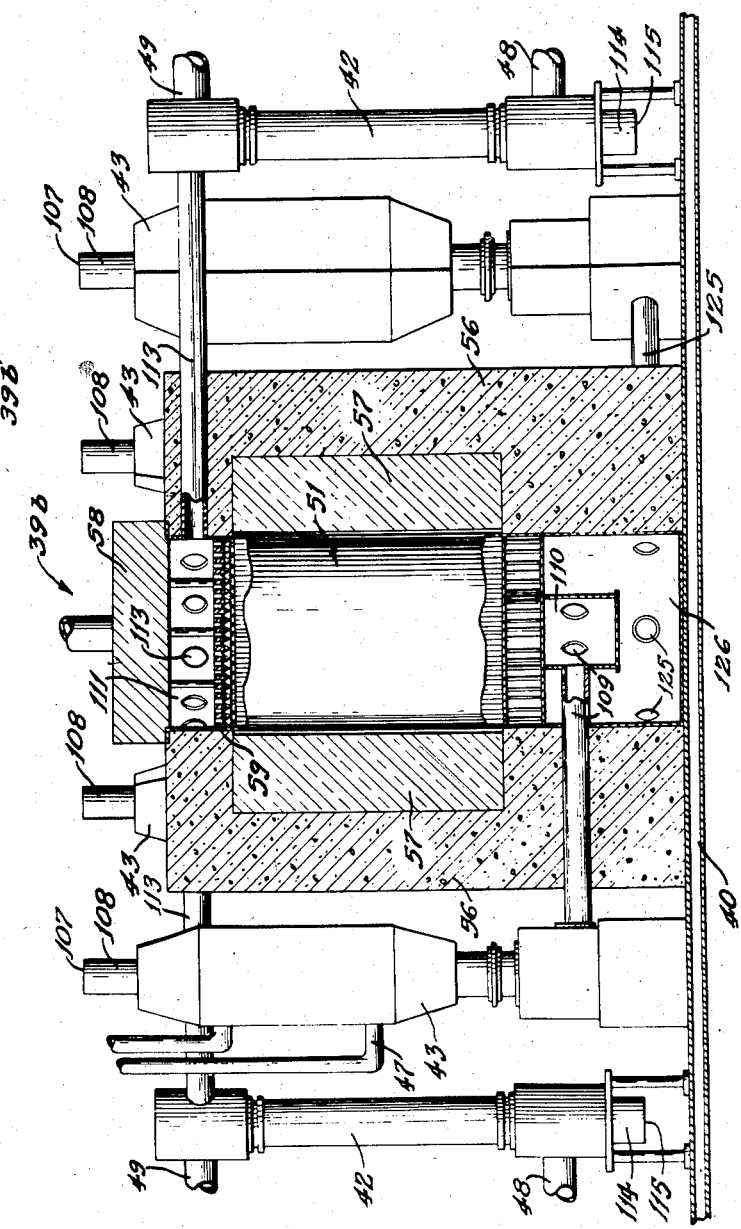
Figure 4 is a schematic plan view of the upward parallel-flow fast breeder reactor and associated primary heat exchangers and primary pumps.

Perhaps the most important flow modification, particularly for very large reactors, is shown in Figure 3. In the parallel-flow reactor 39b shown in this figure, as in the reactor shown in Figure 1, the primary coolant enters the primary coolant system through an inlet pipe 107 in a primary coolant pump inlet pipe 108, is pumped through the primary coolant pump 43 and then through a reactor inlet pipe 109 into a reactor inlet manifold 110. From the reactor inlet manifold the primary coolant passes up through the reactor fuel rods into a reactor plenum 111, thence through reactor outlet pipes 113 into reactor heat exchanger 42 and downwardly through the heat exchanger and out through the heat exchanger exit pipe 114 through the exit 115 into the mass of primary reactor coolant contained in the reactor tank. The parallel-flow reactor 39b differs from the series-flow reactor 39 in that in a second primary coolant system, the coolant is pumped from the primary reactor mass in the reactor tank through the pump 43 and reactor inlet pipe 125 into the reactor blanket manifold 126. The coolant flows upwardly through the blanket rods into the reactor plenum chamber 111 and out through the outlet pipes 113 to primary heat exchangers 42, and thus out into the mass of reactor coolant in the reactor tank 40. As many as eight primary coolant units may be positioned around a large reactor, as shown in Figure 4, thus insuring adequate flow of primary coolant in both core and radial blanket regions without making the pump and heat exchanger units unreasonably large.

The choice of a primary and a secondary coolant for use in the present reactor is very important, not only from the heat transfer standpoint, but also from the safety standpoint. Although there are several liquid metals, such as sodium, sodium-potassium alloys, bismuth, mercury, lead-bismuth alloys, potassium, and lead, which may be used as either the primary or the secondary coolant in the present reactor, a careful survey of the advantages and disadvantages of the various potential coolants has indicated that the preferred primary coolant is sodium and the preferred secondary coolant is sodium-potassium eutectic alloy (hereafter referred to as NaK). The coolant should have good nuclear properties, especially with respect to absorption of neutrons. Of the elements which might be used as liquid heat transfer media in reactors, sodium has the lowest fast-neutron capture cross-section; the cross-section for fission neutrons being approximately 1.4 millibarns. Its thermal neutron capture cross-section is approximately 0.45 barn (10%). Since the present reactor is a fast reactor, the low value of the capture cross-sections for fast neutrons is of prime importance. Other coolants, however, may be used, as has been fully set forth in copending application Serial No. 437,017, now Patent No. 2,841,545, issued July 1, 1958.

All reactors must be cooled after shutdown to remove the decay heat or "afterglow" heat. The power produced after shutdown is proportional to the operating power level, varying with time from a few percent immediately after shutdown, to a fraction of a percent after several days. Because of the high operating power density in the presently described reactor, adequate and reliable cooling had to be provided after shutdown. In some respects cooling after shutdown is more critical than cooling during operation, because the decay heat cannot be turned off. In this reactor, shutdown cooling of the reactor is accomplished by natural convection of the sodium coolant.

A rather unique design has been adapted for the primary system, primarily to effect reliable cooling of the reactor after shutdown, but which also provides other desirable operating characteristics. As was indicated before, the primary system is contained in a single vessel. All of the components in the primary system, including the reactor, the primary sodium pumps and piping, the heat exchanger, and the fuel transfer and storage system, are submerged in sodium. Coolant is pumped directly from the bulk sodium in the primary tank to the reactor, and after flowing through the reactor it passes through the intermediate heat exchanger and returns to the primary tank. This arrangement was adopted for the following reasons:

(1) The large bulk volume of sodium contributes significantly to the reliability and integrity of the primary cooling system. Since the entire system is flooded with coolant (to a level approximately 10 feet above the top of the reactor), loss of reactor coolant is virtually impossible. In addition, the system is ideally suited to natural convection cooling, providing very reliable shutdown cooling in the event of loss of forced convection.

(2) The large bulk volume of sodium provides thermal inertia to the primary system, preventing rapid changes in load demand from being reflected as temperature changes in the coolant entering the reactor. The large heat capacity of the system also provides intrinsic emergency cooling, in conjunction with natural convection, in the event of failure of the heat removal system (secondary sodium system) simultaneous with the loss of forced convection. Such circumstances might arise in the event of a total power failure, in which case the bulk sodium heats very slowly and considerable time is available to initiate stand-by cooling procedures.

(3) Since the reactor demonstrates the method of operation to be employed in a central station power plant, the replacement of fuel must be accomplished in a short time. Shortly after reactor shutdown, the heat generation in the fuel element is high, and reliable cooling must be provided. This is accomplished by unloading and transferring the fuel elements while they are submerged in sodium. They are cooled by natural convection of the sodium, and unloading can begin immediately after shutdown. The fuel elements are transferred to a fuel storage chamber within the primary tank where they continue to cool, by natural convection of the sodium, until removed for processing.

(4) A maximum of integrity is provided with regard to containment of radioactive sodium. The entire radioactive system is confined within the primary tank. A very high degree of integrity is constructed into this vessel, since it is of relatively simple design and contains no external connections below the liquid sodium level. It is of double wall construction as further insurance against failure.

(5) The need for high integrity of the primary sodium piping is eliminated. Small amounts of leakage are permissible, since the leakage is internal. A small amount of leakage actually does occur in the piping system at the connections between the pumps and the reactor and between the reactor and the heat exchanger. These connections are slip joints employed to permit the pumps and heat exchanger to be removed from the system without the necessity of cutting or disconnecting a tight piping system.

(6) All of the radioactivity in the plant is confined in the primary tank, and therefore, only the primary tank requires shielding. Shielded equipment cells and pipe galleries are eliminated.

(7) Auxiliary heating of the primary system sodium (to prevent freezing) is simplified, since the entire system is heated as a unit. The individual components and pipes, etc., are in an "atmosphere" of sodium and the entire system is at the same temperature.

The primary coolant pumps illustrated are direct current electromagnetic pumps. This type of pump, which has been described in such copending applications as Serial No. 364,114, "Direct Current Electromagnetic Pump," by Arthur H. Barnes, filed June 25, 1953, now Patent No. 2,811,923, is particularly suitable for use in the present system, since these pumps have no moving parts, no packing, and essentially no electrical insulation, and hence are capable of operating at high temperature and in intense radiation fields. This pump is also particularly suitable since it presents substantially no hindrance to flow of coolant through the pump induced by convective forces when power is cut off from the pump. This type of pump operates at very low voltage. High currents are required and these may be supplied to the pump, for example, by homopolar generators 46 installed above the top shield 41a. The current is conveyed from the generator to the pump by means of bus bars 46a enclosed in conduits 47. Adequate insulation of the bus bars 46a from the conduit 47 is provided by positioning the bus bar in the conduit so that there is a gas-filled annular separation between the bus bar and the conduit wall.

The piping connecting the pumps, heat exchanger and reactor may be of conventional stainless steel or other suitable heat-resistant alloy. Because of the relatively short length of piping involved and the high temperature of the primary sodium coolant 45 in the reactor tank 40, uninsulated piping may be used. More efficient power transfer, however, may be effected if the piping is insulated from the primary coolant mass 45. The reactor shield 56, while primarily a radiation shield, also serves as insulation for the reactor active portion and prevents excessive heat radiation directly from the reactor active portion to the mass of primary coolant contained in the reactor tank. The heat exchanger 42 is of conventional design, having high heat exchange capacity and being constructed of material resistant to corrosion by sodium and NaK at high temperatures, for example stainless steel.

The heat production of the series-flow reactor has been determined. In the series-flow modification illustrated in Figures 1 and 2, the primary coolant enters the core from the inlet manifold 110, flows upwardly through the core into the plenum 111, and then downwardly through the blanket 53 into the exit manifold 112. The heat production was determined while the reactor was operating at average power. The pertinent figures are shown in Table III.

*Table III*

HEAT PRODUCTION (SERIES FLOW)

Core:
- Total Mw_____ 800
- Specific power, Mw./kg_____ 1.8
- Power density, Mw./l_____ 1.0

Blanket power:
- Total Mw_____ 140
- Power density, Mw./l_____ .016

Total reactor power, Mw_____ 940

Fuel rod:
- Cooling surface, sq. ft_____ 3160
- Average heat flux, B. t. u./(sq. ft.)(hr.)__ $0.875 \times 10^6$
- Maximum heat flux, B. t. u.(sq. ft.)(hr.) $1.25 \times 10^6$ Radial blanket element:
- Cooling surface, sq. ft_____ 4880
- Average heat flux, B. t. u./(sq. ft.) (hr.) 70,000

The pertinent data with respect to the removal of heat from the reactor active portion are shown in Table IV. The reactor considered is a series-flow reactor as previously described and the primary coolant is sodium. It was assumed that there was no heat loss in the piping or to the surfaces of the manifolds or the pump walls. Thus the temperature of the bulk sodium was assumed to be the same as that of the inlet manifold, which is shown in the table as "coolant inlet temperature." The reactor exit temperature was assumed to be the same as the heat exchanger inlet temperature.

*Table IV*

HEAT REMOVAL (SERIES FLOW)

Core:
- Coolant flow area, sq. ft_____ 4.30
- Maximum coolant velocity, F. P. S__ 35
- Core coolant flow rate, G. P. M_____ 63,000
- Core coolant inlet temperature, °F__ 618
- Average coolant temperature rise, °F 324
- Core exit coolant temperature, °F___ 942
- Maximum temperature clad surface, °F 1025
- Maximum fuel alloy temperature, °F_ 1325

Blanket:
- Coolant flow area, sq. ft_____ 6.90
- Flow velocity, F. P. S_____ 20.0
- Average temperature rise, °F_____ 68
- Total Na coolant temperature rise, °F 382
- Total Na flow rate, lbs./hr. $\times 10^6$__ 26.7
- Reactor inlet Na temperature, °F___ 618
- Reactor exit Na temperature, °F____ 1000
- Heat exchanger inlet temperature, °F 1000
- Heat exchanger exit temperature, °F_ 618

The heat exchanger in the secondary heat transfer system is of entirely conventional design.

The steam generation system is entirely conventional and is accordingly not illustrated in the present specification. A suitable steam generation system is illustrated in the copending application Serial No. 437,017, now Patent No. 2,841,545, issued July 1, 1958.

REACTOR OPERATION

The loading and unloading of the reactor is effected by means of a jib crane 50. A crane hook 50a is adapted to engage rod hangers 67. The crane plug 141 is rotatable so that the crane hook 50a can engage any rod 60 or 61 in the reactor active portion and transfer it to any position in the rod storage tanks 44 without raising the rod above the level of the primary coolant 45 in the reactor tank 40. The storage tank platform 142 is provided for the storage tanks 44 to rest upon. The storage tanks 44 are attached to a tank elevator 143 which moves upon ways 144, so that the storage tanks may be raised and placed in conjunction with storage tank plug openings 145. Auxiliary equipment is provided to remove rods from the elevated storage tanks 44 into the processing room 146. A baffle (not shown) extends from the cell roof 41a below the surface of the primary coolant 45 in the reactor tank 40 to prevent the loss of an inert gas atmosphere in the reactor cell. A drain pump and suction line (not shown) are provided for removing the sodium from the reactor tank 40. The suction line may be removed from the reactor cell when not in operation. The tank 40 has a gas line (not shown) so that the space between the walls of the reactor tank may be evacuated during operation of the reactor or the line can be used to introduce hot gases to warm the primary coolant above its melting temperature after long periods of reactor shutdown. Evacuation of the space between the walls of the reactor tank 40 also serves as thermal insulation during operation.

BLANKET SUBDIVISION

Figure 5:
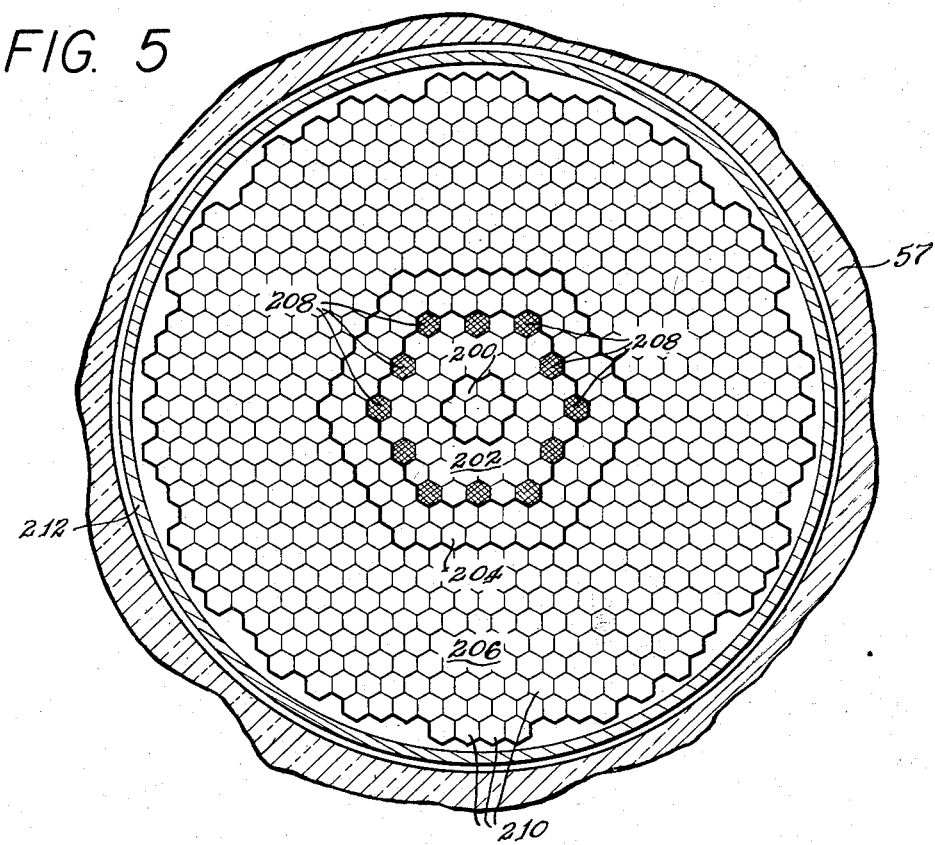
Figure 5 is a cross sectional view of an active portion of the fast breeder reactor showing therein the arrangement of the fertile material in form of blankets inside and outside of a fuel core.

The reactor 39 is approximately 90 inches in diameter and 90 inches in height and is divided into four zones: a central blanket 200, a hollow fuel core 202, an inner blanket 204, and an outer blanket 206 as indicated in Fig. 5. A plurality of control rods 208 are symmetrically spaced in the outer periphery of the core 202. All of the subassemblies 210 are contained in a stainless steel tank 212. Each zone comprises a number of right hexagonal subassemblies 210 containing the fuel or blanket or control elements 60, 61 and 95, respectively. All subassemblies 210 are of identical size, their numerical distribution being as follows:

| | |
|---|---:|
| Central blanket 200 | 7 |
| Core 202 | 42 |
| Control 208 | 12 |
| Inner blanket 204 | 66 |
| Outer blanket 206 | 510 |
| Total | 637 |

The construction of the subassemblies 210 and the various elements contained therein have been previously described hereinabove.

The annular core 202 with a central blanket 200 of uranium has been incorporated to flatten radial distribution of neutron flux and power generation within said core. There is a definite improvement in performance for a "flattened" reactor with a central blanket as compared to an "unflattened" reactor. The use of a central blanket 200 in a large size reactor, as presently described, reduces the maximum to average radial power distribution from approximately 1.5 to 1.0 to approximately 1.15 to 1.0. The maximum power density (power per unit volume of core—kw./liter) is fixed for any given fuel element for specified operating conditions of maximum fuel temperature, maximum coolant flow rate, and minimum coolant temperatures. The ability to remove the heat from the fuel element is the limitation. The flattening of the neutron flux improves the average power density of the reactor for a given attainable maximum power density. For any given power output, the reactor core volume can be made smaller. The use of a central blanket 200 distributes the fissionable material in a less effective manner (the center of the core 202 has maximum effectiveness "high statistical weight") which increases the critical mass. It, therefore, becomes a matter of optimizing the two factors. It should be emphasized that this method of flattening represents an engineering compromise between the ideal system involving the variation of enrichment of the core at all points and a constant enrichment throughout the core. The method presently described, actually employs a two enrichment system. This system, however, does not introduce any additional types of blanket elements because the central blanket 200 and the inner blanket 204 use elements which are identical in fuel composition. This is an important and practical consideration because a minimum number of subassemblies 210 is desired. The use of a central blanket 200 in a reactor also increases the experimental flexibility of the reactor by providing for an experimental enlargement of the core by substitution of fuel subassemblies for central blanket subassemblies. Furthermore, the subassemblies 210 in the central blanket 200 may also be removed and other material may be inserted thereinto for high neutron flux irradiations.

The division of the annular blanket surrounding the core 202 into two separate zones, the inner blanket 204 and the outer blanket 206, is necessitated by the wide variation in power generation across this region and the desire to achieve everywhere the highest possible fraction of unit volume devoted to blanket material (uranium). In the blanket area immediately adjacent to the core 202, namely the inner blanket 204, the unit volume fraction of uranium permissible is relatively low, since the power density is high and cooling is difficult. In the area near the outer periphery, namely in the outer blanket 206, however, the unit volume fraction of uranium is high because the power density is low and cooling is more easily effected.

The subassembly which is placed in the central blanket 200 or the inner blanket 204 will contain a greater number of individual cylinders 90 containing fertile material to provide better cooling, as shown in Fig. 11, than the subassembly which is placed in the outer blanket 206, the latter subassembly containing only a few cylinders 92 as shown in Fig. 12. Therefore the ratio of the amount of fertile material contained in the subassembly placed in the central or inner blanket to the total volume of the subassembly is lower than for the same situation involving the subassemblies placed in the outer blanket. This ratio is commonly called unit volume fraction. The division of the blanket surrounding the core 202 into two zones of different unit volume fractions of uranium represents a practical compromise between an infinite number of such zones and a single zone of constant uranium fraction. Since the power densities within the central blanket 200 and the inner blanket 204 are similar in magnitude, identical subassemblies (both in composition and construction) are used in these zones.

The twelve control rods 208 consist of modified movable subassemblies, as previously described, located at the outer edge of the core 202. Reactor control is effected by moving these rods 208 (in a vertical direction) and thus moving fuel into, or out of, the core 202.

As was indicated previously, a single subassembly size is employed throughout the reactor, resulting in a close packed reactor geometry. The upper end of each subassembly 210 is identical, and all subassemblies can be accommodated by the same handling and transfer devices. Each subassembly 210 contains a number of fuel elements (or blanket elements) of size and shape appropriate to the particular type of subassembly. It is within the skill of nuclear art to vary the number of fuel elements and blanket elements to achieve an operating condition of the reactor. And, therefore, it should not be understood that the present embodiment utilizing a particular number of said elements is the only one that may be achieved with the structure described herein.

Approximate composition (by volume percent) of each type of subassembly 210 is shown in Table V. The fuel alloy employed is composed of an alloy of uranium and plutonium. The blanket material is uranium which has been treated to retain dimensional stability.

*Table V*

SUBASSEMBLY COMPOSITION, VOLUME PERCENT

| Subassembly Type | Fuel Alloy | Uranium | Steel | Sodium |
|---|---|---|---|---|
| Core-fuel section | 30 | 0 | 15 | 55 |
| Core-blanket section | 0 | 30 | 15 | 55 |
| Control-fuel section | 20 | 0 | 20 | 60 |
| Central or inner blanket 204 | 0 | 55 | 15 | 30 |
| Outer blanket 206 | 0 | 80 | 10 | 10 |

As a further aid in understanding the present invention, reference is made to the following publications: Experimental Production of Divergent Chain Reaction, E. Fermi, American Journal of Physics, vol. 20, No. 9, December 1952; Science and Engineering of Nuclear Powers, C. Goodman, Addison Wesley Press, Inc., Cambridge, Mass., vol. 1 (1947) and vol. 2 (1949); The Elements of Nuclear Reactor Theory, S. Glastone and M. Edlund, D. Van Nostrand Co., Inc., New York, 1952; Elementary Pile Theory, H. Soodak and E. C. Campbell, John Wiley and Sons, New York, 1950; and to the copending U. S. patent application, Serial No. 568,904, of common assignee, filed December 19, 1944, in the names of E. Fermi and L. Szilard, since matured into U. S. Patent No. 2,708,656, issued on May 17, 1955.

While the foregoing description of the present invention describes the apparatus and method of operating particular reactors in detail, it is not intended that the scope of the invention be limited except insofar as set forth in the following claims.

What is claimed is:

1. In a fast neutronic reactor having an active portion comprising material fissionable by neutrons, fertile material convertible to a fissionable isotope responsive to neutron irradiation, and a reflector surrounding said materials, the improvement in the active portion comprising a core constructed of fertile material, fissionable material constructed around said core, and additional fertile material constructed around said fissionable material.

2. The apparatus as claimed in claim 1, the fertile material comprising depleted uranium and the fissionable material comprising plutonium-uranium alloy.

3. In a fast neutronic reactor having an active portion comprising material fissionable by neutrons, fertile material convertible to a fissionable isotope responsive to neutron irradiation, and a reflector surrounding said materials, the improvement in the active portion comprising a core constructed of fertile material of low unit volume fraction to form a central blanket, a fissionable material constructed about said central blanket to form a fuel core, additional fertile material of low unit volume fraction constructed about said fuel core to form an inner blanket, and further fertile material of high unit volume fraction constructed around the inner blanket to form an outer blanket.

4. The apparatus as claimed in claim 3, the fertile materials comprising depleted uranium and the fissionable material comprising plutonium-uranium alloy.

References Cited in the file of this patent

Ohlinger: "Nucleonics," vol. 5, No. 6, pp. 38–44, December 1949.

Zinn: "Nucleonics," vol. 10, No. 9, pp. 8–14, September 1952.

"Chemical and Engineering News," vol. 31, No. 22, pp. 2294–6, June 1, 1953.

Gribe: "Nucleonics," vol. 12, No. 2, pp. 13–15, February 1954.

Barnes et al.: "International Conference on the Peaceful Uses of Atomic Energy," vol. 3, pp. 330–344, August 1955.

Tittenton: "Atomics," pp. 10–13, January 1955.

Glasstone: "Principles of Nuclear Reactor Engineering," D. Van Nostrand Co., Inc., 1955, pp. 832–838.